(12) United States Patent
Patel et al.

(10) Patent No.: US 7,187,759 B2
(45) Date of Patent: Mar. 6, 2007

(54) MOBILE VOICE MAIL SCREENING METHOD

(76) Inventors: Pramodkumar Patel, 632 W. Mountain Vista Dr., Phoenix, AZ (US) 85045; Erwin P. Comer, 19788 E. Via Del Rancho, Queen Creek, AZ (US) 85242

( * ) Notice: Subject to any disclaimer, the term of this patent is extended or adjusted under 35 U.S.C. 154(b) by 25 days.

(21) Appl. No.: 10/912,855

(22) Filed: Aug. 6, 2004

(65) Prior Publication Data
US 2006/0029189 A1 Feb. 9, 2006

(51) Int. Cl.
*H04M 11/00* (2006.01)
(52) U.S. Cl. .............. 379/88.18; 379/88.22; 455/560
(58) Field of Classification Search ........ 455/2.01; 370/352, 356; 379/88.18, 88.22
See application file for complete search history.

(56) References Cited

U.S. PATENT DOCUMENTS

| | | | |
|---|---|---|---|
| 6,473,422 B2* | 10/2002 | Hall et al. | 370/352 |
| 6,519,252 B2* | 2/2003 | Sallberg | 370/356 |
| 6,639,972 B1* | 10/2003 | Cannon et al. | 379/88.18 |
| 6,792,244 B2* | 9/2004 | Ross et al. | 455/2.01 |
| 2002/0075850 A1* | 6/2002 | Cruz et al. | 370/352 |
| 2003/0143973 A1* | 7/2003 | Nagy et al. | 455/403 |
| 2005/0201534 A1* | 9/2005 | Ignatin | 379/88.22 |
| 2005/0213740 A1* | 9/2005 | Williams et al. | 379/211.02 |

\* cited by examiner

*Primary Examiner*—Fan Tsang
*Assistant Examiner*—M. S. A. Elahee
(74) *Attorney, Agent, or Firm*—Frank J. Bogacz; Kevin D. Wills

(57) ABSTRACT

A voice mail method screens calls made by a calling subscriber (10) to a called subscriber (20) which is unavailable (or otherwise screening calls). The screening method determines (110) whether the called subscriber (20) has a voice mail screening feature. An internet protocol multi-media system (50) receives the call from the called subscriber (114). The internet protocol multi-media system then transfers call control to a voicemail screening server which plays subscriber (20) the beginning of the voicemail message being left by subscriber (10) and offers to-route the call back to the called subscriber (20). The called subscriber then indicates via a short code whether the called subscriber will accept the call (124).

18 Claims, 4 Drawing Sheets

MOBILE VOICE MAIL SCREENING METHOD

BACKGROUND OF THE INVENTION

The present invention pertains to communication systems and more particularly to Real-time screening of voice mail messages in such communication systems.

Although a communication system is in the midst of taking a voice mail message from a calling subscriber to a called subscriber, it may be advantageous to the called subscriber to listen to the beginning of this message to be better able to identify the caller in a real-time manner. This is commonly referred to as call screening.

In a wire line communication system, call screening may be achieved by answering machines, for example. The called party may listen to the calling party's voice as the calling party leaves a message on an answering machine connected to the called subscriber's wireline phone line. The called party has at all times the option of picking up (going off hook) and immediately connecting to the calling party. This may be dictated by the identity of the calling party or some particularly urgent message that the calling party is leaving for the called party.

Today, voice mail systems in wireless communication systems typically route a message to a voice mail system which is connected to a mobile switching center of the wireless communication system. Once an incoming call is rerouted from the called subscriber to the voice mail system of the mobile switching center, the subscriber can no longer listen to the voice mail message. Further, the called party may not be able to identify the calling party who is leaving the message until the message has been completed. The called party may then retrieve any stored messages. Typically this takes several minutes for saving of messages to occur and notification to the called subscriber that a voice mail message has been recorded. Furthermore the calling party will have disconnected by then. The called party cannot reenter the active call to a voicemail system once the message deposit process has begun. In wireless communication systems, "caller ID" is not always available and is not always useful in screening calls. This lack of usefulness manifests itself when it is the importance of the message itself and not the identification of the caller that is sought.

A similar situation can occur in wireline networks where the called subscriber may utilize the centralized voicemail services of their carrier rather than the traditional desktop answering machine.

Accordingly it would be highly desirable to have a method for a called party to hear the voice mail message in any communication system and for the called party to connect to the calling party in a real-time manner.

PREFERRED EMBODIMENT OF THE INVENTION

Figure 1:
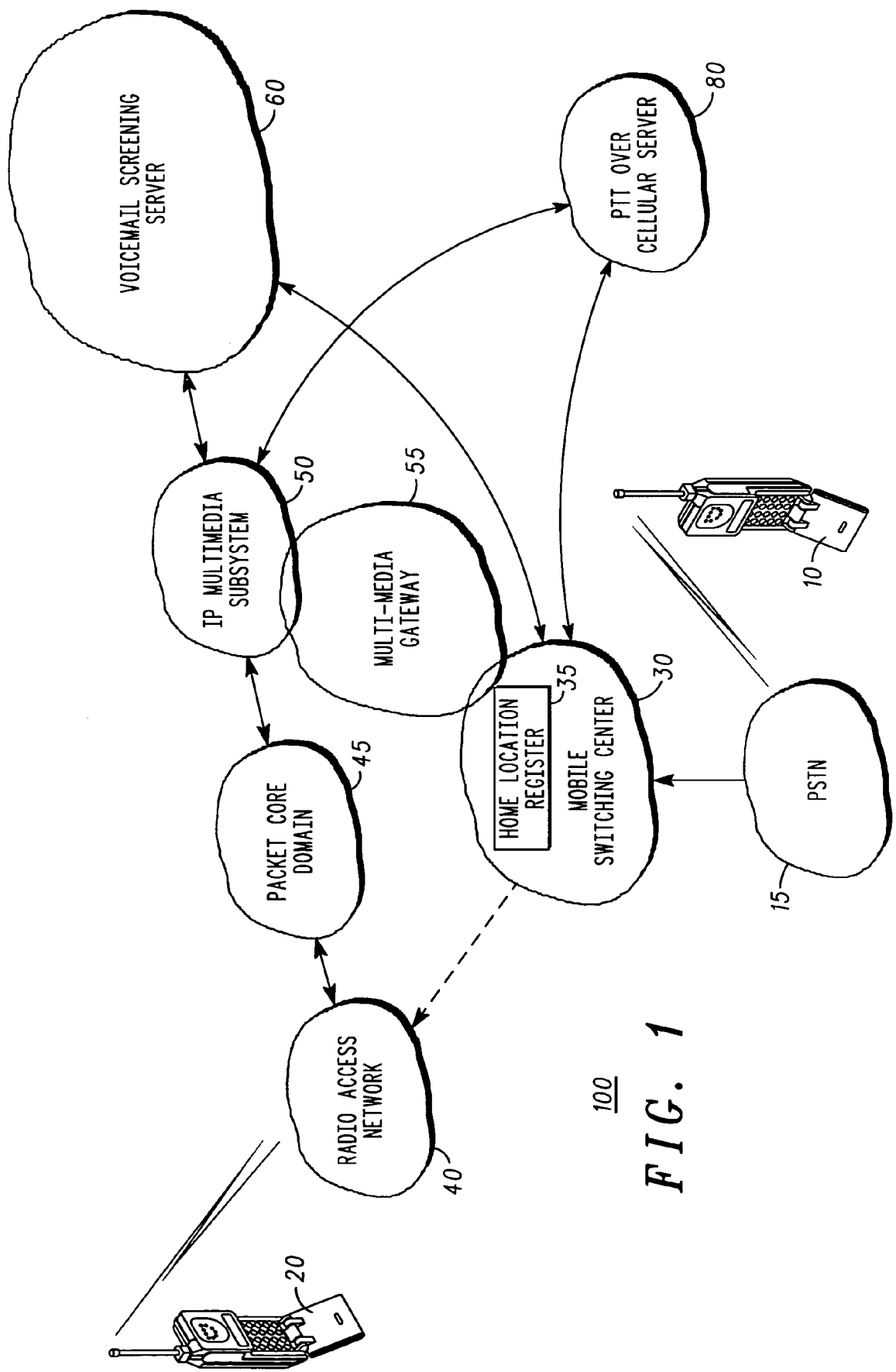
FIG. 1 is a block diagram of a wireless communication system in accordance with the present invention.

Referring to FIG. 1, a block diagram of a wireless call screening arrangement is shown. The system 100 shown in FIG. 1 may be a wireless cellular system such as: an iDEN system made by Motorola, Inc., UMTS (Universal Mobile Telecommunication System) mobile system, a GSM (Global System Mobile) system or a CDMA (Code Division Multiple Access) system. Subscriber 10 places a call to subscriber 20.

Subscriber 10 is connected to the public switch telephone network/ISDN 15 through either the mobile switching center (MSC) 30 or through the IP Multimedia Subsystem 50 and through radio access network 40 to subscriber 20. The determination of the bearer path is determined by the Multi-Media Gateway (MMG) 55 upon querying the Home Location Register 35 which informs MMG 55 of the path depending upon the capabilities and subscriptions of 20.

Called subscriber 20 may not be reachable for a variety of reasons. For example, subscriber 20 may be busy, poor reception may exist, or subscriber 20 may simply not respond. Since subscriber or called party 20 has a voice screening feature, mobile switching center 30 transfers the communication to IP multi-media subsystem (IMS) 50 if the call path was originally routed through MSC 30 otherwise the call is already maintained in the IP multi-media subsystem (IMS) 50.

The IMS 50 recognizes that the call is forwarded to it as a result of the call screening from subscriber 20 (e.g. because subscriber 20 is not answering). Call control is transferred from IMS 50 to voice screening server 60. Voice screening server (VSS) 60 plays an announcement to the calling subscriber 10 indicating that subscriber 10 has reached subscriber 20's voice mail system. VSS 60 then begins recording calling subscriber 10's message.

Once the VSS 60 has initiated recording subscriber 10's message, VSS 60 sends an offer message through the IMS 50 for the called subscriber 20. The VSS 60 continues to record the message of the calling subscriber 10, but after recording for a pre-configurable amount of time sends the "offer message" to the called party 20 through IMS 50; then forwards the call back through packet domain 45 or through MSC 30 depending upon the capabilities of subscriber 20 as determined by home location register (HLR) 35, through radio access network 40 to called subscriber 20. This screened message delivery may occur via a push-to-talk over cellular (PoC) 80 call or by a multimedia message service delivery.

Upon receipt of the PoC 80 called subscriber 20 has the option first, to either first ignore the call or second, redirect the call back to subscriber 20's handset and answer the call. Redirecting the call back to subscriber 20 is accomplished by sending a message with a short code to the IMS 50 to have voice mail screening server 60 redirect the call back to subscriber 20 via MMG 55.

Figure 2:
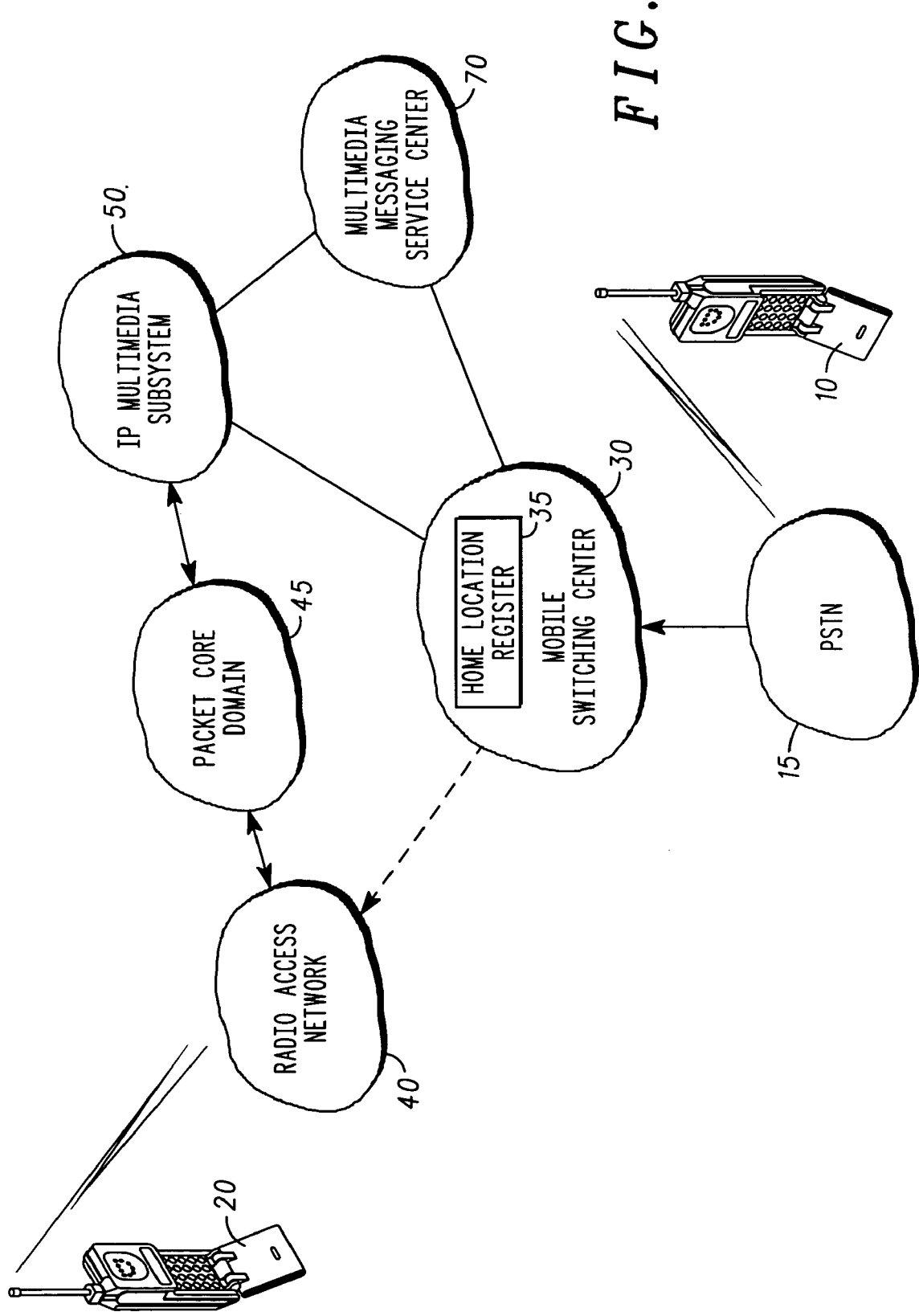
FIG. 2 is a block diagram of an alternate embodiment of a wireless communication system in accordance with the present invention.

Referring to FIG. 2, an alternate embodiment of a mobile voice mail screening arrangement is shown. The arrangement and processing for FIG. 2 is the same as FIG. 1, up to the point at which the IMS 50 is routing the call for voice mail processing. Instead of routing the call to a voice mail screening service 60, IMS 50 routes the call to a multi-media messaging service center (MMSC) 70. Instead of switching the call back to the IMS 50, the MMSC 70 will switch the call back through mobile switching center 30 or IMS 60 depending upon 20's capabilities as determined by HLR 35 and radio access network 40 to subscriber 20. The MMSC 70 may perform voice mail type functions and in addition may perform value added services such as, but not limited to, performing voice to text translations of the voice mail either in whole or part.

The MMSC 70 can provide a wider range of services than the voice mail screening server 60.

Figure 3:
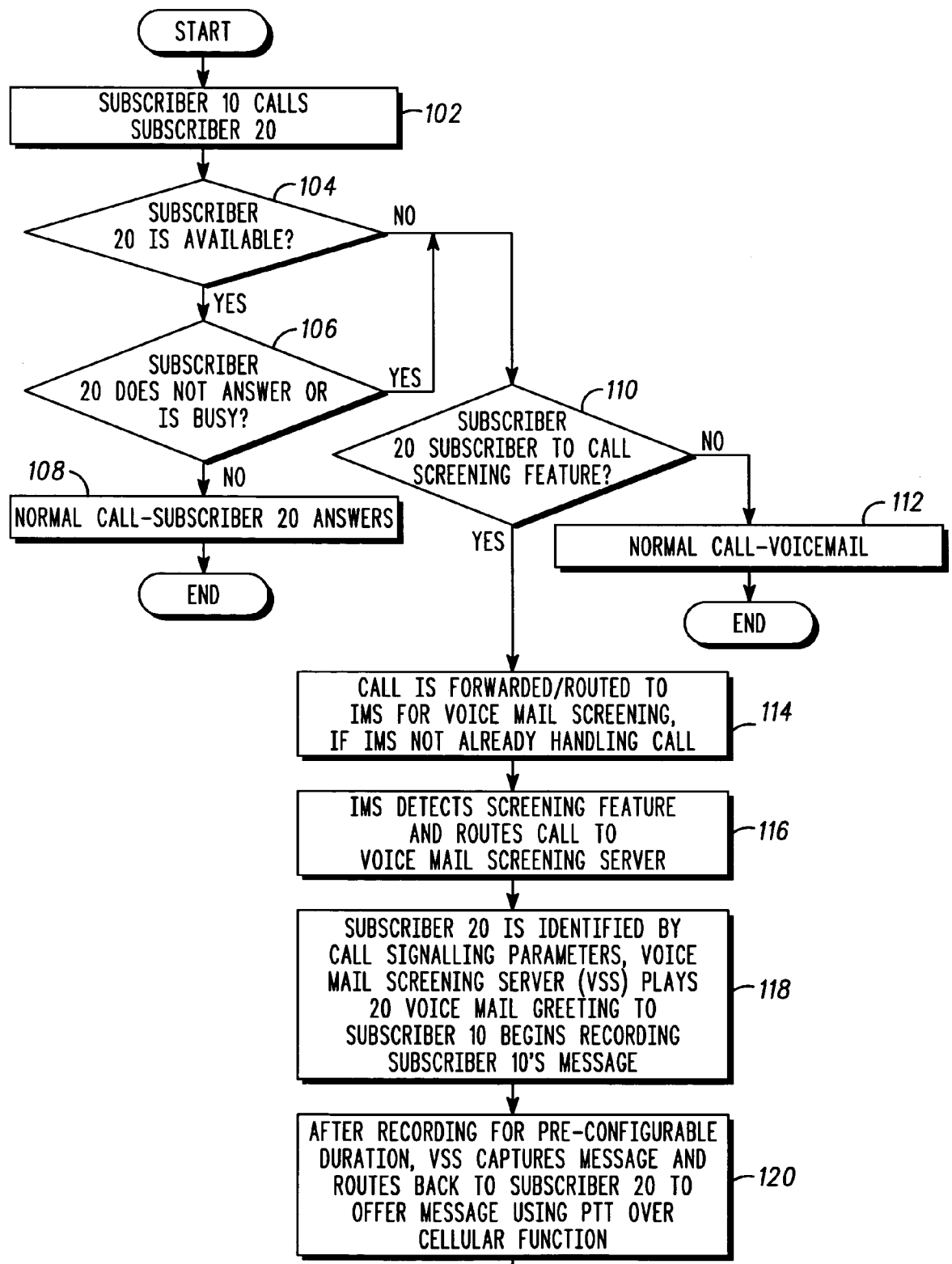
FIGS. 3 and 4 are a flow chart of a real time voice mail retrieval method in accordance with the present invention.
Figure 4:
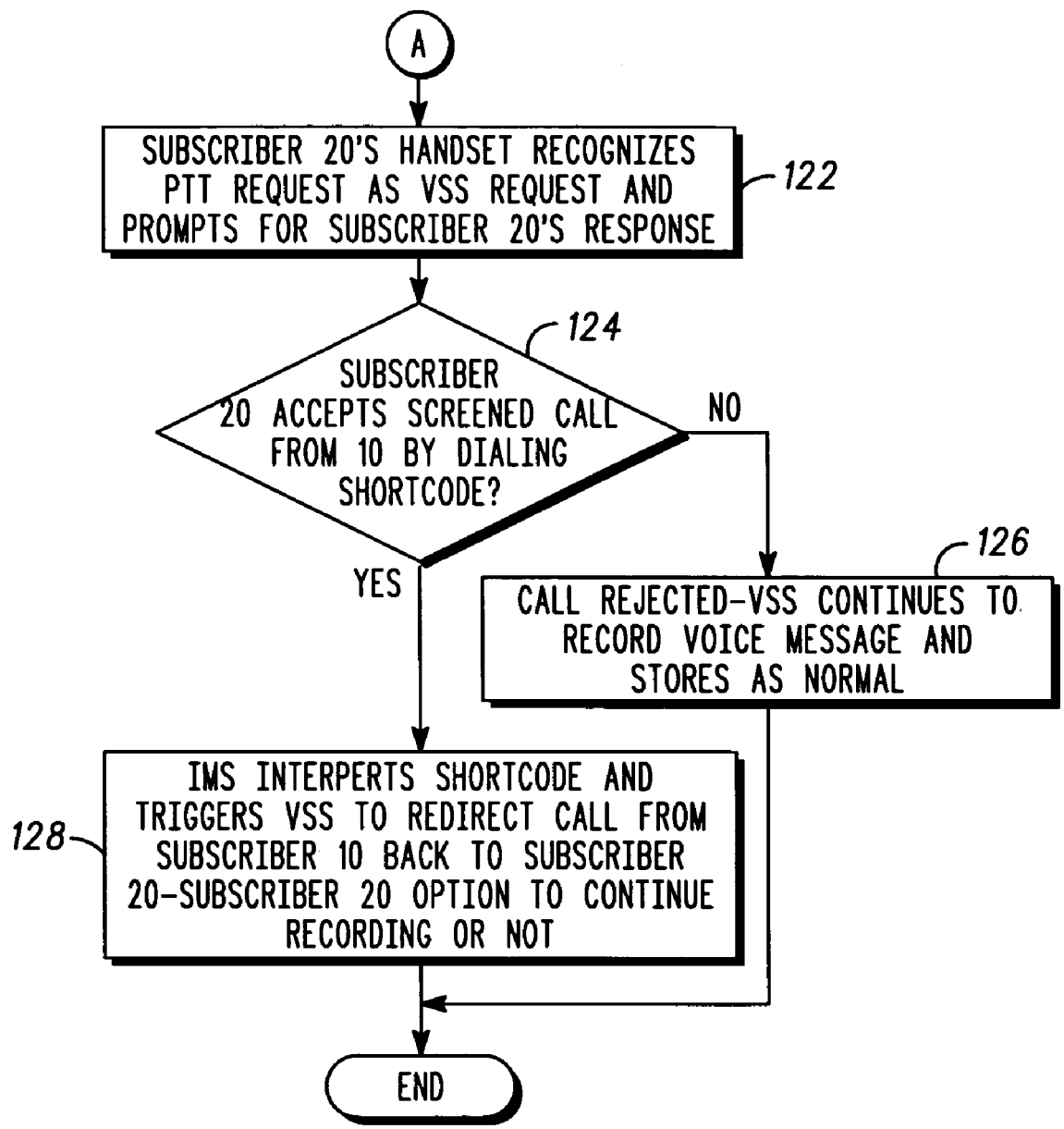

Referring to FIGS. 3 and 4, the methodology for a mobile voice screening arrangement is shown. The process is started and block 102 is entered. Subscriber 10 makes a call to subscriber 20, block 102. Next, if called subscriber 20 is unavailable for any reason, block 104 makes that determination. If subscriber 20 is unavailable, block 104 transfers control to block 106 via the yes path. Block 106 determines whether subscriber 20 has not answered or has his line busy. If not, block 106 transfers control to block 108. This is a normal call and the processing is handled as is typical. The process is then ended.

If subscriber 20 is unavailable, block 104 transfers control to block 110 via the no path. In addition if subscriber 20 does not answer or the line is busy, block 106 transfers control to block 110 via the yes path.

Block 110 determines whether subscriber 20 has a call screening feature. If not, block 110 transfers control to block 112 which handles the call in a normal fashion. Then the process is ended.

If subscriber 20 has a call screening feature, block 110 transfers control to block 114 via the yes path. Block 114 forwards the call to subscriber 20 to the IP multi-media subsystem (IMS) 50 for voice mail screening. Next, the IMS 50 detects the voice mail screening feature as active for subscribe 20 and routes the call to the voice mail screening server 60, block 116.

Next, subscriber 20, the called subscriber, is identified by call signaling parameters. Voice mail screening server 60 plays called party 20's voice mail greeting to the calling subscriber 10. VSS 60 begins recording subscriber 10's message, block 118.

After recording for a configurable duration, VSS 60 captures subscriber 10's message and sends an offer message back to the called subscriber 20 to offer called subscriber 20 a chance to recapture the call using the push-to-talk over cellular function, block 120. Next, block 122 subscriber 20 recognizes the push-to-talk over cellular function as a voice mail screening server request. The VSS then prompts subscriber 20 for a response of whether subscriber 20 desires that subscriber 10's call be returned to subscriber 20.

The VSS then determines whether subscriber 20 wishes to have the call from subscriber 10 in response to subscriber 20's short code. If the VSS does not detect the short code, block 124 transfers control to block 126 via the no path. Subscriber 20 has rejected the call. The VSS continues to record the voice message and stores the message as for normal processing, block 126. The process is then ended.

If subscriber 20 selects the appropriate short code for receiving subscriber 10's call back, block 124 transfers control to block 128 via the yes path. The IP multi-media subsystem 50 interprets the short code and triggers voice mail screening server 60 to redirect the call of subscriber 10 back to subscriber 20. Subscriber 20 has the option to continue the recording or not. The call flow will be altered according to the selection of subscriber 20, block 128. The process is then ended.

As can be seen from the above description, the above invention provides a unique feature for communication systems. That feature is the ability to perform voice mail screening of an incoming call just as is done by land lines and an answering machine.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A voice mail screening method for a communication system comprising the steps of:
    making a call by a calling subscriber to a called subscriber wherein the call is routed through one of a mobile switching center (MSC) or through an internet protocol multi-media system;
    determining whether the called subscriber has a voice mail screening feature;
    transferring the call if routed through the mobile switching center (MSC) to the internet protocol multi-media system;
    transferring control of the call from the internet protocol multi-media system to a voice screening server (VSS);
    initiating recording of a voice message from the calling subscriber to the voice screening server;
    sending an offer message recorded by the voice screening server (VSS) to the called subscriber through the internet protocol multi-media system, wherein the offer message is a portion of the voice message previously recorded from the calling subscriber; and
    indicating by the called subscriber whether the called subscriber will accept the call.

2. The voice mail screening method as claimed in claim 1, wherein there is further included a step of determining whether the called subscriber is unavailable or busy.

3. The voice mall screening method as claimed in claim 2, wherein if the called subscriber is unavailable or busy, there is further included a step of performing the step of determining that the called subscriber has a voice mail screening feature.

4. The voice mail screening method as claimed in claim 1, wherein there is further included a step of recording by the voice mail screening server a message of the calling subscriber for the called subscriber.

5. The voice mail screening method as claimed in claim 4, wherein there is further included a step of re-routing by the voice mail screening server the call to the called subscriber via a push-to-talk cellular function (PoC).

6. The voice mail screening method as claimed in claim 5, wherein the step of sending the offer message includes a step of requesting by the voice mail screening sewer to the called subscriber whether the called subscriber will answer the call.

7. The voice mail screening method as claimed in claim 6, wherein there is further included a step of sending a message by the called subscriber to the voice mail screening sewer (VSS) for indicating that the called subscriber will accept in real time the call.

8. The voice mail screening method as claimed in claim 7, wherein if the called subscriber does not accept the call, there is further included a step of continuing to record byte VSS the message of the calling subscriber.

9. The voice mail screening method as claimed in claim 8, wherein if the called subscriber accepts the call, there is further included the step of triggering by the internet protocol multi-media system to redirect the call to the called subscriber.

10. The voice mail screening method as claimed in claim 9, wherein in response to the internet protocol multi-media system, there is further included a step of inhibiting the step of continuing to record the message of the calling subscriber.

11. The voice mail screening method as claimed in claim 1, wherein there is further included a step of forwarding by the internet protocol multi-media system the call to a multi-media messaging service center.

12. The voice mail screening method as claimed in claim 11, wherein there is further included a step of recording the message of the calling subscriber by the multi-media messaging service center.

13. The voice mail screening method as claimed in claim 12, wherein there is further included a step of transmitting a message of the multi-media messaging service center to the called subscriber through an originating mobile switching center and a radio access network.

14. The voice mail screening method as claimed in claim 12, wherein there is further included a step of transmitting the message of the multi-media messaging service center to the called subscriber through internet protocol multi-media system and the radio access network.

15. The voice mail screening method as claimed in claim 1, wherein the communication system comprises and iDen mobile communication system.

16. The voice mail screening method as claimed in claim 1, wherein the communication system comprises a Code Division Multiple Access (CDMA) mobile communication system.

17. The voice mail screening method as claimed in claim 1, wherein the communication system comprises a Universal Mobile Telecommunication System (UMTS) mobile communication system.

18. The voice mail screening method as claimed in claim 1, wherein the mobile communication system comprises a Global System Mobile (OSM) communication system.

\* \* \* \* \*